United States Patent
Lewis et al.

(10) Patent No.: US 10,136,191 B1
(45) Date of Patent: Nov. 20, 2018

(54) METHODS, SYSTEMS, AND MEDIA FOR RECOMMENDING MEDIA CONTENT BASED ON ATTRIBUTE GROUPED VIEWING SESSIONS

(71) Applicant: Google LLC, Mountain View, CA (US)

(72) Inventors: Justin Lewis, South San Francisco, CA (US); Scott Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/380,307

(22) Filed: Dec. 15, 2016

Related U.S. Application Data

(60) Provisional application No. 62/433,168, filed on Dec. 12, 2016.

(51) Int. Cl.
*H04H 60/32* (2008.01)
*H04N 21/482* (2011.01)
(Continued)

(52) U.S. Cl.
CPC ... *H04N 21/4826* (2013.01); *G06F 17/30864* (2013.01); *G06F 17/30991* (2013.01);
(Continued)

(58) Field of Classification Search
CPC . H04N 21/25; H04N 21/252; H04N 21/44204
See application file for complete search history.

(56) References Cited

U.S. PATENT DOCUMENTS

| 8,365,227 | B2 | 1/2013 | Xue et al. | |
|---|---|---|---|---|
| 2010/0287588 | A1* | 11/2010 | Cox | H04N 5/44543 725/40 |
| 2014/0297790 | A1* | 10/2014 | Song | H04N 21/251 709/217 |

OTHER PUBLICATIONS

Dias et al., "Improving Music Recommendation in Session-Based Collaborative Filtering by using Temporal Context", Technical University of Libson, Sep. 16, 2013, pp. 1-6.
(Continued)

*Primary Examiner* — Olugbenga O Idowu
(74) *Attorney, Agent, or Firm* — Byrne Poh LLP

(57) ABSTRACT

Methods, systems, and media for recommending media content based on attribute grouped viewing sessions are provided. In some embodiments, the method comprises: receiving an authorization to access a media content consumption history associated with an authenticated user account, wherein the media content consumption history includes a plurality of viewing sessions that each include media content items that have been consumed during that viewing session and wherein each of the plurality of viewing sessions is associated with session attribute information; determining whether the session attribute information associated with the plurality of viewing sessions meets session attribute criteria; generating a plurality of session group profiles by grouping a subset of viewing sessions from the plurality of viewing sessions based on the session attribute information meeting the session attribute criteria; determining that a user device using the authenticated user account is consuming a media content item in a current viewing session; determining whether the user device is likely to view additional media content items associated with at least one of the plurality of session group profiles by comparing session attributes of the current viewing session with each of the plurality of session group profiles; in response to determining that the current viewing session matches a session group profile from the plurality of session group profiles based on the comparison, combining the media content items associated with the session group profile with the media content item in the current viewing session; and causing a recommended media content item to be presented on the user device for the user of the authenticated user account, wherein the recommended media content item is selected from the combined media content items.

17 Claims, 6 Drawing Sheets

(51) Int. Cl.
  *H04L 29/08* (2006.01)
  *H04N 21/442* (2011.01)
  *H04N 21/475* (2011.01)
  *H04N 21/466* (2011.01)
  *H04N 21/45* (2011.01)
  *H04N 21/6334* (2011.01)
  *H04N 21/258* (2011.01)
  *G06F 17/30* (2006.01)

(52) U.S. Cl.
  CPC ..... *H04L 67/306* (2013.01); *H04N 21/25816* (2013.01); *H04N 21/44222* (2013.01); *H04N 21/4532* (2013.01); *H04N 21/4668* (2013.01); *H04N 21/4753* (2013.01); *H04N 21/6334* (2013.01)

(56) References Cited

OTHER PUBLICATIONS

Park et al., "Session-Based Collaborative Filtering for Predicting the Next Song", Seoul National University, Mar. 20, 2011, pp. 1-6.
Wang et al., "Effective Personalized Recommendation Based on Time-Framed Navigation Clustering and Association Mining", in Expert Systems with Applications, vol. 27, Oct. 2004, pp. 1-13.

\* cited by examiner

METHODS, SYSTEMS, AND MEDIA FOR RECOMMENDING MEDIA CONTENT BASED ON ATTRIBUTE GROUPED VIEWING SESSIONS

CROSS-REFERENCE TO RELATED APPLICATIONS

This application claims the benefit of U.S. Provisional Patent Application No. 62/433,168, filed Dec. 12, 2016, which is hereby incorporated by reference herein in its entirety.

TECHNICAL FIELD

The disclosed subject matter relates to methods, systems, and media for recommending media content based on attribute grouped viewing sessions.

BACKGROUND

Many users access media content from content provision services that provide each user with a user account which allows the user to store preferred settings for accessing media content items and allows a content provision service to recommend particular media content items that may be identified as being desirable to the user for consumption.

At the same time, it is popular for users to consume media content using shared accounts, consume media content together using one user's account, and even consume media content using another person's account. In these instances, some of the media content items consumed in connection with a user's account may not be media content items that the user is actually interested in. As a result, the content provision services associated with that user account can, at times, recommend media content items to the user associated with the user account based on media content items that the user was not actually interested in.

Accordingly, it is desirable to provide new methods, systems, and media for recommending media content based on attribute grouped viewing sessions.

SUMMARY

Methods, systems, and media for recommending media content based on attribute grouped viewing sessions are provided.

In accordance with some embodiments of the disclosed subject matter, a computer-implemented method for recommending media content based on viewing sessions is provided, the method comprising: receiving, using a hardware processor, an authorization to access a media content consumption history associated with an authenticated user account, wherein the media content consumption history includes a plurality of viewing sessions that each include media content items that have been consumed during that viewing session and wherein each of the plurality of viewing sessions is associated with session attribute information; determining whether the session attribute information associated with the plurality of viewing sessions meets session attribute criteria; generating a plurality of session group profiles by grouping a subset of viewing sessions from the plurality of viewing sessions based on the session attribute information meeting the session attribute criteria; determining that a user device using the authenticated user account is consuming a media content item in a current viewing session; determining whether the user device is likely to view additional media content items associated with at least one of the plurality of session group profiles by comparing session attributes of the current viewing session with each of the plurality of session group profiles; in response to determining that the current viewing session matches a session group profile from the plurality of session group profiles based on the comparison, combining the media content items associated with the session group profile with the media content item in the current viewing session; and causing a recommended media content item to be presented on the user device for the user of the authenticated user account, wherein the recommended media content item is selected from the combined media content items.

In some embodiments, the session attribute criteria includes application context.

In some embodiments, determining whether the session attribute information associated with the plurality of viewing sessions meets session attribute criteria further comprises determining whether the session attribute information associated with each of the plurality of viewing sessions indicates that the application context is included in one of a subset of a plurality of application contexts.

In some embodiments, the session attribute criteria includes an indication that a viewing session was a shared screen session using a media playback device.

In some embodiments, the session attribute criteria includes device configuration information associated with a device that presented the media content items in one of the plurality of viewing sessions.

In some embodiments, the current viewing session includes media content items that have been presented and related media content items that relate to at least one of the media content items.

In some embodiments, the recommended media content item presented on the user device is selected from the combined media content items and media content items associated with similar session group profiles associated with user accounts other than the authenticated user account.

In some embodiments, the method further comprises applying a representative weight to each media content item associated with one of the plurality of viewing sessions, wherein the representative weight is determined based on a normalized probability that each media content item will be watched by users who have also seen the remaining media content items in that viewing session.

In some embodiments, the method further comprises applying a matching weight to each of the plurality of viewing sessions, wherein the matching weight is determined based on a similarity score between the current viewing session and one of the plurality of viewing sessions.

In accordance with some embodiments of the disclosed subject matter, a system for recommending media content based on viewing sessions is provided, the system comprising a hardware processor that is configured to: receive an authorization to access a media content consumption history associated with an authenticated user account, wherein the media content consumption history includes a plurality of viewing sessions that each include media content items that have been consumed during that viewing session and wherein each of the plurality of viewing sessions is associated with session attribute information; determine whether the session attribute information associated with the plurality of viewing sessions meets session attribute criteria; generate a plurality of session group profiles by grouping a subset of viewing sessions from the plurality of viewing sessions based on the session attribute information meeting the session attribute criteria; determine that a user device using the authenticated user account is consuming a media content item in a current viewing session; determine whether the user device is likely to view additional media content items associated with at least one of the plurality of session group profiles by comparing session attributes of the current viewing session with each of the plurality of session group profiles; in response to determining that the current viewing session matches a session group profile from the plurality of session group profiles based on the comparison, combine the media content items associated with the session group profile with the media content item in the current viewing session; and cause a recommended media content item to be presented on the user device for the user of the authenticated user account, wherein the recommended media content item is selected from the combined media content items.

In accordance with some embodiments of the disclosed subject matter, a non-transitory computer-readable medium containing computer executable instructions that, when executed by a processor, cause the processor to perform a method for recommending media content based on viewing sessions is provided, the method comprising: receiving an authorization to access a media content consumption history associated with an authenticated user account, wherein the media content consumption history includes a plurality of viewing sessions that each include media content items that have been consumed during that viewing session and wherein each of the plurality of viewing sessions is associated with session attribute information; determining whether the session attribute information associated with the plurality of viewing sessions meets session attribute criteria; generating a plurality of session group profiles by grouping a subset of viewing sessions from the plurality of viewing sessions based on the session attribute information meeting the session attribute criteria; determining that a user device using the authenticated user account is consuming a media content item in a current viewing session; determining whether the user device is likely to view additional media content items associated with at least one of the plurality of session group profiles by comparing session attributes of the current viewing session with each of the plurality of session group profiles; in response to determining that the current viewing session matches a session group profile from the plurality of session group profiles based on the comparison, combining the media content items associated with the session group profile with the media content item in the current viewing session; and causing a recommended media content item to be presented on the user device for the user of the authenticated user account, wherein the recommended media content item is selected from the combined media content items.

In accordance with some embodiments of the disclosed subject matter, a system for recommending media content based on viewing sessions is provided, the system comprising: means for receiving an authorization to access a media content consumption history associated with an authenticated user account, wherein the media content consumption history includes a plurality of viewing sessions that each include media content items that have been consumed during that viewing session and wherein each of the plurality of viewing sessions is associated with session attribute information; means for determining whether the session attribute information associated with the plurality of viewing sessions meets session attribute criteria; means for generating a plurality of session group profiles by grouping a subset of viewing sessions from the plurality of viewing sessions based on the session attribute information meeting the session attribute criteria; means for determining that a user device using the authenticated user account is consuming a media content item in a current viewing session; means for determining whether the user device is likely to view additional media content items associated with at least one of the plurality of session group profiles by comparing session attributes of the current viewing session with each of the plurality of session group profiles; in response to determining that the current viewing session matches a session group profile from the plurality of session group profiles based on the comparison, means for combining the media content items associated with the session group profile with the media content item in the current viewing session; and means for causing a recommended media content item to be presented on the user device for the user of the authenticated user account, wherein the recommended media content item is selected from the combined media content items.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
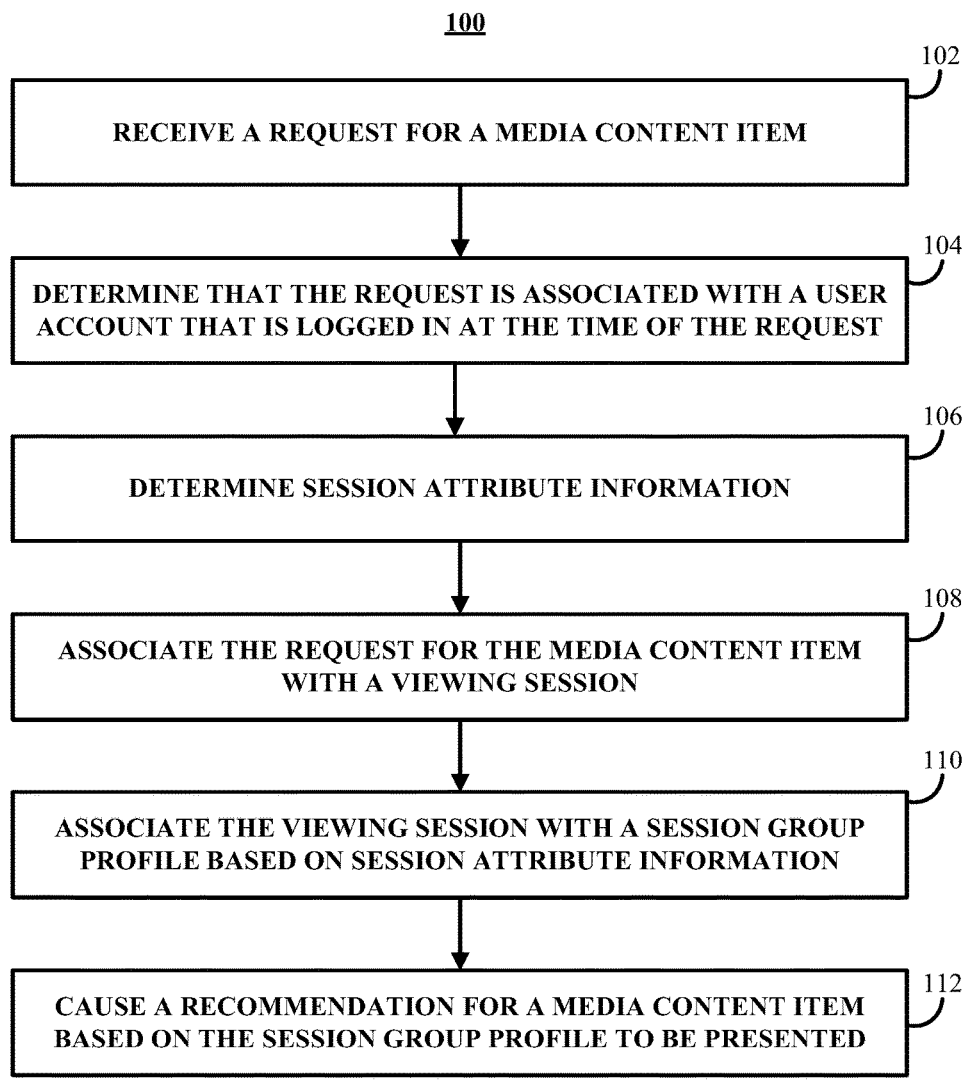
FIG. 1 shows an illustrative example of a process for presenting recommended media content based on attribute grouped viewing sessions in accordance with some embodiments of the disclosed subject matter.

In accordance with various embodiments of the disclosed subject matter, mechanisms (which can include methods, systems, and media) for recommending media content based on attribute grouped viewing sessions are provided.

Previously, content sharing platforms generally search for and recommend content items based on similarity of content. For example, if a user watches a sports video, these content sharing platforms are likely to recommended content that includes additional sports videos having content similar to the watched sports video. In another example, these content sharing platforms may find other users who have watched the same video and transmit a recommendation that includes other videos that have been watched by this group of users. Content similarity, however, is not always an effective assumption.

Moreover, providing recommended content items that a user is likely to watch becomes increasingly complicated as content sharing platforms expand by provide different versions of a content sharing platform (e.g., a children's version of the content sharing platform, a gaming-related version of the content sharing platform, etc.). Providing recommended content items that a user is likely to watch is also difficult as user accounts tend to be used by a number of users (e.g., multiple members of a family).

Instead, these mechanisms considers the user consumption history with sessions whose session attributes match the context of the current session. Generally speaking, the mechanisms can be used to present media content recommendations that are determined based on media content items from viewing sessions that are grouped by one or more session attributes. For example, the mechanisms can determine that some viewing sessions generally included video content items directed to children-related content (e.g., based on metadata and/or based on the video content items being watched in a children's application area), while other viewing sessions included more diverse content. In response, the mechanisms can create a first session group profile associated with the children-related content and a second session group profile for the remaining content. Upon receiving a subsequent request for a children's video in a current viewing session (or determining that a current viewing session is directed to children-related content), the mechanisms can then present a recommendation that is based on the first session group profile and its corresponding children-related content and is not influenced by the video content items corresponding to the second session group profile.

These mechanisms can be used in variety of applications. For example, computing devices may be shared by a child user and an adult user, where the child user consumes content using an account associated with the adult user, and these mechanisms can transmit content recommendations and/or advertisement recommendations that are appropriate for the child user or for the adult user based on the current viewing session. In another example, this can inhibit content recommendations and/or advertisement recommendations from being polluted such that children-related content due to content consumed by the child user is not used to influence a recommendation to a viewing session deemed to be for an adult user or such that adult-related content due to content consumed by the adult user is not used to influence a recommendation to a viewing session deemed to be for a child user. In yet another example, these mechanisms can transmit content recommendations and/or advertisement recommendations to present content within a vertical application (e.g., a gaming-related instance of a media playback application, a children-related instance of a media playback application, a spherical video-related instance of a media playback application, etc.).

In some embodiments, the mechanisms can review media content consumption history that includes one or more previously requested media content items, such as those contained in user session logs associated with an authenticated user account, to generate one or more media session profiles for each authenticated user account. For example, based on user session logs of requested media content items associated with an authenticated user account, the mechanisms can determine that the user account has engaged in multiple viewing sessions based on the amount of time separating each of the media content items in the logs, where each viewing sessions contains one or more video content items.

It should be noted that each viewing session can be associated with one or more session attributes. Session attributes can include, for example, application context information (e.g., a particular application that was used to playback the media content item, a particular area of an application that was used to playback the media content item, a particular type of application that was used to playback the media content item, etc.), device configuration information (e.g., a device identifier of a device that was used to playback the media content item, device characteristics of a device that was used to playback the media content item, etc.), and/or shared session information (e.g., information that a particular type of media playback device streamed or otherwise transmitted a media content item to a display device for consumption by one or more viewers).

In some embodiments, the mechanisms can generate one or more session group profiles by grouping a subset of viewing sessions from the multiple viewing sessions based on session attributes. For example, in some embodiments, viewing sessions can be grouped based on particular session attribute criteria concerning application context—e.g., viewing sessions executed by a particular application, such as a children's version of a media playback application). In another particular example, viewing sessions can be grouped based on execution in applications except for a particular application—e.g., viewing sessions except those executed in the children's version of the media playback application. In another example, device configuration information can be used to group together viewing sessions—e.g., group together viewing sessions performed on the same device, group together viewing sessions performed on devices having similar device characteristics, such as screen size, video resolution, video playback capabilities, audio playback capabilities, and device type. In yet another example, shared session information can be used to group viewing sessions—e.g., group together viewing sessions in which a media playback device was used to stream and/or otherwise transmit a media content item for presentation on a display device by one or more viewers.

It should be noted that the session attribute criteria can include any suitable combination of these session attributes. For example, in some embodiments, viewing sessions can be grouped to combine viewing sessions executed using a particular type of application (e.g., a children's version of a media playback application) and using a media streaming device (e.g., indicating a shared screen session). In another example, in some embodiments, viewing sessions can be grouped to combine viewing sessions executed on particular types of devices (e.g., mobile devices) and executing using particular types of applications (e.g., mobile versions of media playback applications).

In some embodiments, the mechanisms can cluster or otherwise combine these viewing sessions that share particular session attributes to create a session group profile. Accordingly, for each cluster, a session group profile having particular session attributes can be created.

In some embodiments, the mechanisms can use these session group profiles to recommend content in a current viewing session. For example, in response to reviewing one or more media content items that the user is currently consuming or has consumed in the current viewing session, the mechanisms can compare the one or more media content items from the current viewing session against the session group profiles. In another example, this can be performed in response to receiving a request for a media content item at the start or during a current viewing session. Such a comparison of a media content item against each session group profile can, for example, return a score (e.g., from 0 to 1) that describes the normalized likelihood that a similar session group profile includes the video content item.

In some embodiments, the mechanisms can select particular session group profiles (e.g., session group profiles have a score greater than a particular threshold score) and combine the media content items associated with each selected session group profile along with the media content items consumed during the current viewing session. Accordingly, this combination of media content items can be used by the mechanisms to determine which media content item to recommend. For example, this can include recommending a popular media content item from the combined media content items, a media content item from the combined media content items that has been consumed by users within a particular time period (e.g., most views in the last 24 hours), etc.

Additionally or alternatively, in some embodiments, each media content item associated with a session group profile can be assigned a weighted value. For example, each video content item included in a session group profile may have been watched during a viewing session that fits that session group profile but may not represent the session group profile as well as another video content item. In continuing this example, a weighted value can be assigned based on a normalized probability of the likelihood that a video content item will be watched by a user who was seen the other video content items in the same session group profile. As such, the weighted value associated with a media content item can be used to modify the amount of weight is given to a previously consumed media content item.

Additional alternatively, in some embodiments, it should be noted that a current viewing session can be associated with multiple session profiles. When evaluating the current viewing session, a weight can be used to influence the recommended media content item by, for example, multiplying a session profile weight associated with a session group profile with a media content item weight associated with a media content item.

Turning to FIG. 1, an illustrative example of a process 100 for recommending media content based on attribute grouped viewing sessions is shown in accordance with some embodiments of the disclosed subject matter.

At 102, process 100 can receive a request to access a media content item.

It should be noted that the request to access a media content item can originate from any suitable source. For example, the request can originate from a user device 510 and/or 512 as described below in connection with FIG. 5, or any other device suitable for presenting media content.

It should also be noted that the request can be associated with and/or include any suitable information. For example, the request can be associated with and/or include information identifying a user account, information identifying a user device (e.g., a user device 510 and/or 512 as described below in connection with FIG. 5), information identifying a device configuration (e.g., a device configuration as described below in connection with 212 of FIG. 2), information identifying an application that originated the request, any other suitable information, or any suitable combination thereof. As another example, in a situation where the request originates from a user device that is executing a web browsing application, the request can be associated with and/or include information identifying a Uniform Resource Locator ("URL") and/or top-level domain of a web site that referred the user device to the requested URL. As yet another example, in a situation where the request originates from a user device that is executing an application that originated the request, the request can be associated with and/or include information that identifies a page and/or other location in the application that referred the user device to the requested device (e.g., the information can be a Uniform Resource Identifier ("URI") associated with the page and/or location).

At 104, process 100 can determine that the request to access the media content item is associated with a user account that is logged in (and/or authenticated) at the time of the request.

It should be noted that process 100 can determine that the request is associated with a user account that is logged in (and/or authenticated) based on any suitable information. For example, process 100 can perform the determination based on an identifier associated with the user account that is received with the request. As another example, process 100 can perform the determination based on an Internet Protocol address associated with the request.

It should also be noted that process 100 can determine that the request is associated with a user account that is logged in (and/or authenticated) using any suitable technique or combination of techniques. For example, process 100 can make the determination by querying a database of login information (e.g., as described below in connection with FIG. 5). As another example, process 100 can make the determination based on information received with the request (e.g., as described above in connection with 102 of FIG. 1).

At 106, process 100 can determine session attribute information associated with viewing sessions corresponding to the user account. For example, as described herein, process 100 can review media content consumption history that includes one or more previously requested media content items, such as those contained in user session logs associated with an authenticated user account, to generate one or more media session profiles for the authenticated user account.

It should be noted that session attribute information can include any information related to one or more suitable session attributes. For example, session attribute information can include information indicating a device configuration (e.g., a device configuration as described below in connection with 212 of FIG. 2), a device type (e.g., a mobile device, a desktop computer, a media streaming device, a display device, and/or any other suitable device type), a particular user device (e.g., a unique identifier associated with the user device), an application used to present the media content (e.g., a media playback application, a mobile instance of a media playback application, a children-related instance of a media playback application, etc.), a particular domain, sub-domain, and/or web page used to request and/or present the session, a time of day at which the media content presented in a viewing session took place, a geographic location associated with a viewing session, any other suitable information, or any suitable combination thereof.

It should also be noted that, prior to recording and/or accessing information related to a user's playback of and/or request for media content items, or any other information relating to the user, process 100 can provide the user with an opportunity to provide affirmative consent or authorization to record any of the information described herein (e.g., as described below in connection with 304 of FIG. 3). For example, upon loading a media playback application on a user device, the media playback application can prompt the user to provide authorization for recording information associated with a user's playback of and/or request for media content items. In a more particular example, in response to downloading the media playback application and/or loading the media playback application on the user device, the user can be prompted with a message that requests that the user provide consent prior to recording any information. Additionally or alternatively, in response to installing the media playback application, the user can be prompted with a permission message that requests that the user provide consent prior to recording any information.

In some embodiments, session attribute information can include information indicating an application context (e.g., information related to the application being used at the time of the request for the media content item and/or during the presentation of the media content item). For example, session attribute information can indicate that a requested media content item was presented in a full screen mode, theater mode, or any other suitable mode of presentation. As another example, session attribute information can indicate an application area (e.g., based on information associated with the request as described above in connection with 102), such as an application area directed to children-related content, an application area directed to sports-related content, an application area directed to gaming-related content, an application area directed to business users, an application area directed to content creators, any other suitable application area, or any suitable combination thereof. As yet another example, in a situation where the application being used at the time of the request is a web browser accessing a web site, the application context can include information indicating a particular domain, sub-domain, and/or web page used to request and/or present the session. In a more particular example, the domain, sub-domain, and/or web page can correspond to application areas as described above.

In some embodiments, session attribute information can include information relating to device characteristics of a device that was used to present the media content item. For example, device characteristic information can indicate, either directly or indirectly, that the device used to present the media content item was a media playback device used for a shared session information, where the media content item was streamed or otherwise transmitted to a display device for consumption by one or more viewers of the display device.

In some embodiments, session attribute information can include information relating to media content items requested and/or presented during the viewing session. For example, session attribute information can include metadata associated with the media content items requested and/or presented during the viewing session. In a more particular example, the metadata associated with a media content item can include a category, genre, or vertical, where such metadata can be used to build session group profiles with viewing sessions including media content items having the same or similar category, genre, or vertical. In another example, session attribute information can include a number of media content items requested during the viewing session (e.g., such that viewing sessions having less than a threshold number of media content items can be removed from analysis).

In some embodiments, session attribute information can be determined using any suitable technique or combination of techniques. For example, process 100 can transmit a request for session attribute information to the user device that originated the request for the media content item. As another example, process 100 can query a database that stores session attribute information associated with the user account and/or media consumption history associated with the user account (e.g., as described below in connection with FIG. 5). As yet another example, process 100 can determine session attribute information based on information contained in, or received in connection with, the request for the media content item (e.g., as described above in connection with 102). As a more particular example, in a situation where the user device transmits the request for the media content item using an application that is associated with a particular media platform, (e.g., a mobile application that is directed to accessing a particular social media platform), or a media playback application (e.g., a media streaming application), the application can be configured to transmit session attribute information in connection with the request.

At 108, process 100 can associate the request for the media content item with a viewing session.

It should be noted that process 100 can associate the request for the media content item with a viewing session using any suitable technique or combination of techniques. For example, process 100 can associate the request for the media content item with a viewing session using process 200 as described below in connection with FIG. 2.

In some embodiments, a viewing session can include any suitable set of media content items requested and/or presented in connection with a user account. For example, a viewing session can include a set of media content items requested and/or presented consecutively from the same user account (e.g., including media content items from multiple devices authenticated with the same user account). As another example, a session can include media content items requested and/or presented non-consecutively (e.g., requested and/or presented with intervening media content items, and/or with an intervening period of time between requests and/or presentations). As another example, a viewing session can be a set of media content items requested and/or presented from the same user account and also from the same device. As a more particular example, in a situation where a user account is logged in from two separate devices, a first viewing session can be a set of media content items requested from the first device (e.g., user device 510, as described below in connection with FIG. 5) and a second viewing session can be a set of media content items requested from the second device (e.g., user device 512, as described below in connection with FIG. 5).

In some embodiments, a viewing session can be determined based on any suitable information. For example, a viewing session can be determined based on any of the information described below in connection with 206, 208, 210, and 212 of FIG. 2. As another example, a viewing session can be determined based on requested media content items associated with the user account (e.g., media content items contained in a media content consumption history associated with the user account). In such an example, the viewing session can be determined based on any suitable information about the requested media content items, such as metadata information. As a more particular example, the viewing session can be determined based on metadata information indicating that a subset of the requested media content items are similar (e.g., have similar topics, belong to similar genres, and/or are similar with respect to any other suitable metadata information). As another more particular example, the viewing session can be determined based on information indicating that viewing sessions associated with other user accounts included the same or similar media content items.

In some embodiments, a viewing session can include any suitable information. For example, a viewing session can include a start time, an end time, one or more media identifiers for media content items requested during the viewing session, metadata associated with the one or more media content items requested during the viewing session, information identifying a user account associated with the viewing session, user-selectable privacy settings associated with the use of information included in the viewing session, any other suitable information, or any suitable combination thereof. As another example, a viewing session can include session attribute information as described above in connection with 106.

In some embodiments, the request for the media content item can be associated with a viewing session based on any suitable information. For example, the request for the media content item can be associated with a viewing session based on session attribute information as described above in connection with 106 and/or any of the information described below in connection with 206, 208, 210, and 212 of FIG. 2. In such an example, the session attribute information can be related to the current viewing session and/or existing viewing sessions. As another example, the request for the media content item can be associated with a viewing session based on information indicating that the request is related to a search query associated with the viewing session. As a more particular example, in a situation where a search query returns a plurality of search results that includes the requested media content item, the request for the media content item can be associated with a viewing session that includes other media content items that were included in the search results and subsequently requested.

In some embodiments, process 100 can determine that the request for the media content item is not to be associated with a previous session, and generate a new session that the request for the media content item is to be associated with (e.g., as described below in connection with 216 of FIG. 2).

At 110, process 100 can associate the viewing session with a session group profile based on session attribute information. For example, process 100 can determine whether one or more session group profiles from multiple session group profiles associated with the authenticated user account have similar session attribute information to the session attribute information associated with the current viewing session. In a more particular example, based on the session attribute information associated with the viewing session, process 100 can generate session attribute criteria for finding one or more session group profiles having session attribute information that matches the session attribute criteria.

In some embodiments, a session group profile can include any suitable information related to a group of viewing sessions (e.g., a particular group of viewing sessions associated with the same user account). For example, the session group profile can include information related to each of the media content items requested and/or presented during each of the viewing sessions in the group, such as metadata associated with each of the media content items. As another example, the session group profile can include session attribute information (e.g., as described above in connection with 106) for each of the viewing sessions placed in the group.

In some embodiments, the user account that is logged in at the time of the request for the media content item can be associated with one or more existing session group profiles. In some such embodiments, process 100 can associate the current viewing session with a session group profile by comparing the current viewing session with the one or more existing session group profiles associated with the user account. For example, process 100 can compare the session attribute information associated with the current viewing session with any session attribute information associated with the one or more existing session group profiles. In such an example, process 100 can associate the current viewing session with any of the one or more existing session group profiles having one or more session attributes that are the same or similar. As a more particular example, process 100 can associate the current viewing session with a session group profile that is associated with a shared screen device configuration if the session attribute information corresponding to the session group profile indicates that the current viewing session also has a shared screen device configuration. As another more particular example, process 100 can associate the current viewing session with a session group profile that is associated with a particular application area or vertical (e.g., a children-related instance of an application) if the session attribute information corresponding to the session group profile indicates that the current viewing session is also associated with that particular application area or vertical.

In some embodiments, process 100 can associate the current viewing session with a session group profile based on a comparison of the session group profile and the media content item with session group profiles associated with other user accounts (e.g., as described below in connection with 404 of FIG. 4).

In some embodiments, process 100 can associate the current viewing session with multiple session group profiles (e.g., as also described below in connection with FIG. 4).

In some embodiments, associating the viewing session with a session group profile can be based on any suitable session attribute information (e.g., as described above in connection with 106) associated with the viewing session and/or the session group profile. For example, the viewing session can be associated with a particular session group profile based on session attribute information indicating that the media content items in the viewing session were presented and/or requested in connection with a particular application area (e.g., a children's content application area) that is associated with the particular session group profile. As another example, the viewing session can be associated with a particular session group profile based on session attribute information indicating that the media content items in the viewing session were presented and/or requested in connection with a particular device configuration (e.g., a shared screen configuration) that is associated with the particular session group profile.

In some embodiments, additionally or alternatively to using session attribute information, process 100 can compare the one or more existing session group profiles to the requested media content item based on similar session group profiles associated with other user accounts (e.g., as described below in connection with 404).

In some embodiments, process 100 can associate the viewing session with a session group profile by generating a new session group profile based on the session attribute information associated with the current viewing session (e.g., as described below in connection with FIG. 3).

At 112, process 100 can transmit a recommendation for a media content item that is based on the session group profile. For example, process 100 can present recommended media content items in a recommendation interface while the media content item in the current viewing session is being presented in a media interface. In another example, process 100 can generate an ordered list of recommended media content item, where the recommended media content items are presented to a user of the authenticated user account upon completion of the requested media content item or upon receiving a suitable indication to cease presenting the requested media content item.

In some embodiments, process 100 can determine the recommended media content items using any suitable technique or combination of techniques. For example, process 100 can determine the recommended media content items by identifying other session group profiles that are similar to the session group profile or profiles associated with the media content item at 110 (e.g., as described below in connection with 412 of FIG. 4). As another example, process 100 can determine the recommended media content items by determining popular media content items (e.g., that are most often requested in connection with one or more of the media content items included in the session group profile including the requested media content item). As yet another example, process 100 can determine the recommended media content items by selecting a subset of the media content items included in the session group profile that are similar to the requested media content item based on metadata. In such an example, process 100 can determine the recommended media content items by identifying other media content items that have metadata similar to the selected subset. As still another example, process 100 can determine the recommended media content items using process 400, as described below in connection with FIG. 4.

It should be noted that, in some embodiments, process 100 can determine the recommended media content items using any suitable information. For example, process 100 can determine the recommended media content items using session attribute information associated with the session group profile, using other information associated with the user account (e.g., user settings, user content preferences, recent search queries), social media connection information (e.g., information identifying media content items popular among social media connections to the user account), popularity information (e.g., as described below in connection with 412), any other suitable information, or any suitable combination thereof.

In some embodiments, process 100 can cause the recommended media content items to be presented using any suitable technique or combination of techniques. For example, process 100 can transmit the recommendation to the user device (e.g., via server 502 and communication network 506 as described below in connection with FIG. 5) in connection with the requested media content item. As another example, process 100 can transmit the recommendation to a server that is providing the requested media content item to the user device.

Figure 2:
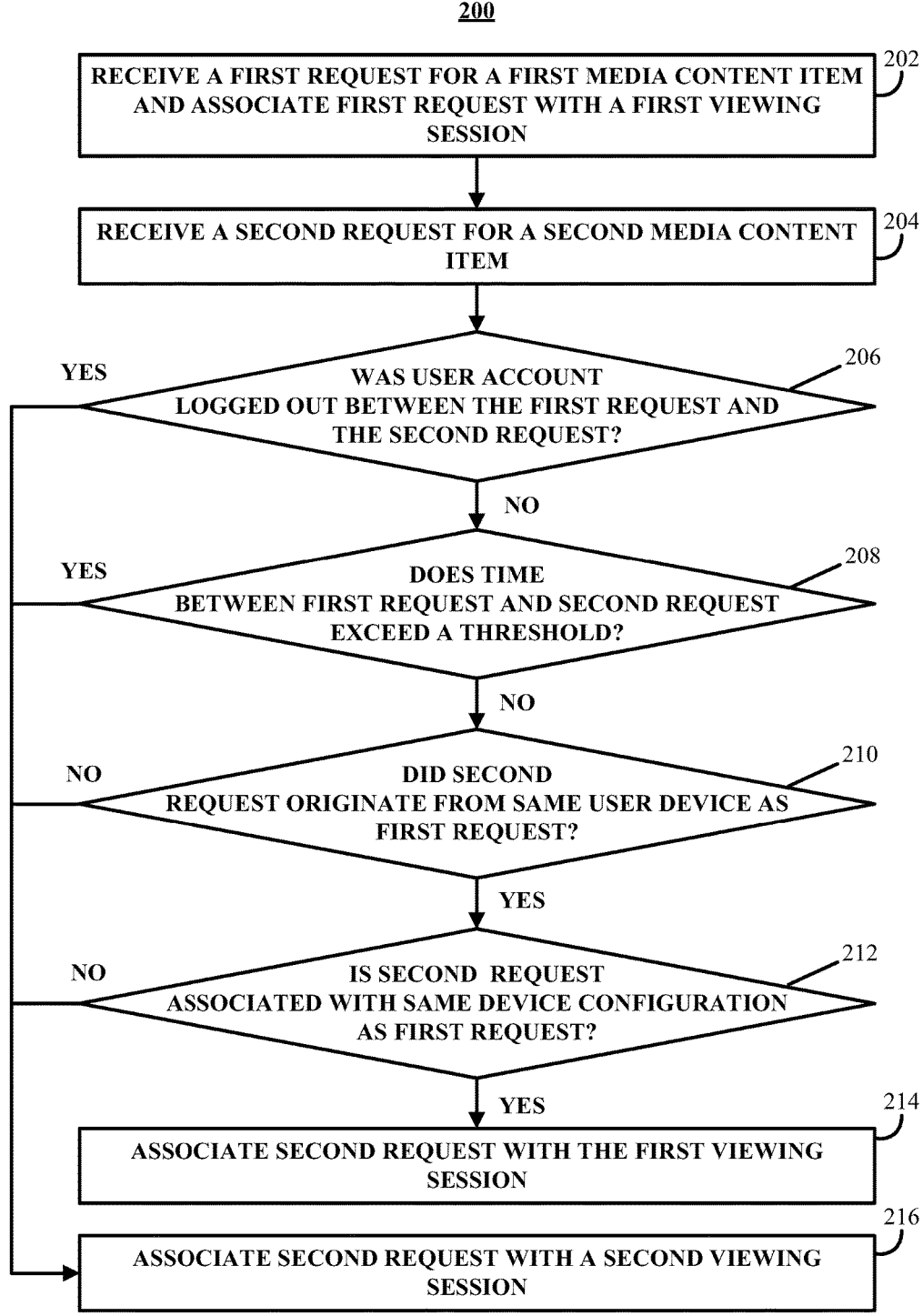
FIG. 2 shows an illustrative example of a process for associating a request for media content with a viewing session in accordance with some embodiments of the disclosed subject matter.

Turning to FIG. 2, FIG. 2 shows an illustrative example 200 of a process for associating a request for media content with a viewing session in accordance with some embodiments of the disclosed subject matter.

At 202, process 200 can receive a first request for a first media content item and associate the first request with a first viewing session.

In some embodiments, process 200 can associate the first request with a first viewing session using any suitable criteria. For example, process 200 can use criteria as described below in connection with 206, 208, 210, and 212.

In some embodiments, the first viewing session can be an existing viewing session. Alternatively, process 200 can generate the first viewing session in response to receiving the first request and associate the first request with the generated first viewing session.

In some embodiments, the first request can originate from any suitable source. For example, the first request can originate from a user device (e.g., user device 510 and/or 512, as described below in connection with FIG. 5). As another example, the first request can originate from a server (e.g., server 502, as described below in connection with FIG. 5).

At 204, process 200 can receive a second request for a second media content item.

In some embodiments, the second request can originate from any suitable source. For example, the second request can originate from a user device (e.g., user device 510 and/or 512, as described below in connection with FIG. 5). As another example, the second request can originate from a server (e.g., server 502, as described below in connection with FIG. 5).

At 206, process 200 can determine whether a user account associated with the first and second requests was logged out between the first and second requests.

In some embodiments, process 200 can determine whether the user account was logged out using any suitable technique or combination of techniques and using any suitable information. For example, process 200 can query a database that records information concerning log-ins and log-outs for user accounts (e.g., as described below in connection with FIG. 5).

At 208, process 200 can determine whether a time between the first request and the second request exceeds a predetermined threshold.

In some embodiments, process 200 can determine whether the time exceeds the predetermined threshold using any suitable technique or combination of techniques. For example, process 200 can query a database that logs timing information associated with each request for media content items in connection with user accounts, such as a media content consumption history database described below in connection with FIG. 5.

In some embodiments, the predetermined threshold can be any suitable time value. For example, the predetermined threshold can be a period of minutes, hours, days, any other suitable time value, or any suitable combination thereof.

At 210, process 200 can determine whether the second request originated from the same user device as the first request.

In some embodiments, process 200 can determine whether the second request originated from the same user device using any suitable technique or combination of techniques and using any suitable information. For example, process 200 can compare a MAC address, a device identifier, a serial number, and/or any other suitable identifying information of a user device, compare unique identifiers included in the requests that correspond to user devices, transmit a request to each user device for a unique identifier that corresponds to the user device, use any other suitable technique and/or information, or any suitable combination thereof.

At 212, process 200 can determine whether the second request is associated with the same device configuration as the first request.

In some embodiments, process 200 can determine whether the second request is associated with the same device configuration using any suitable technique or combination of techniques and using any suitable information. For example, process 200 can transmit a request to the user device for device configuration information in connection with each request. As another example, process 200 can receive session attribute information, as described above in connection with 106, and determine whether the second request is associated with the same device configuration based on the received session attribute information.

In some embodiments, the requests can be associated with any suitable device configuration. For example, a device having a particular screen resolution, a device having a particular screen size, a device having particular network bandwidth, a shared screen device configuration, an independent device configuration, a device configuration involving a media streaming device and a display device, a device configuration involving a computer and an audio device, any other suitable device configuration, or any suitable combination thereof.

At 214, process 200 can associate the second request with the first viewing session.

In some embodiments, process 200 can associate the second request with the first viewing session based on determining that the user account was not logged out between the first and second requests at 206, determining that the time between the first and second requests does not exceed a threshold at 208, determining that the first and second requests originated from same user device at 210, and/or determining that the first and second requests are associated with the same device configuration at 212.

Although associating the second request with the first viewing session is illustrated in FIG. 2 as depending on the determinations of 206, 208, 210, and 212, in some embodiments, process 200 can associate the second request with the first viewing session based on none of, or only a portion of, the determinations of 206, 208, 210, and 212. For example, process 200 can associate the second request with the first viewing session based on any suitable session attribute information as described above in connection with 106. As another example, process 200 can associate the second request with the first viewing session based only on the determination of 208.

Alternatively, at 216, process 200 can associate the second request with a second viewing session.

In some embodiments, process 200 can associate the second request with a second viewing session based on determining that the user account was logged out between the first and second requests at 206, determining that the time between the first and second requests exceeds a threshold at 208, determining that the first and second requests did not originate from the same user device at 210, and/or determining that the first and second requests are not associated with the same device configuration at 212.

In some embodiments, process 200 can associate the second request with a second viewing session by generating the second viewing session based on the second request.

Although associating the second request with a second viewing session is illustrated in FIG. 2 as depending on the determinations of 206, 208, 210, and 212, in some embodiments, process 200 can associate the second request with the first viewing session based on none of, or only a portion of, the determinations of 206, 208, 210, and 212. For example, process 200 can associate the second request with a second viewing session based on any suitable session attribute information as described above in connection with 106. As another example, process 200 can associate the second request with the first viewing session based only on the determination of 208.

In some embodiments, in addition to associating the second request with a second viewing session, process 200 can determine that the first viewing session has ended based on the same determinations of 206, 208, 210, and 212.

Although the determinations of 206, 208, 210, and 212 are illustrated in a particular order to avoid over-complicating the figure, 206, 208, 210, and 212 can occur in any suitable order and/or occur simultaneously.

Figure 3:
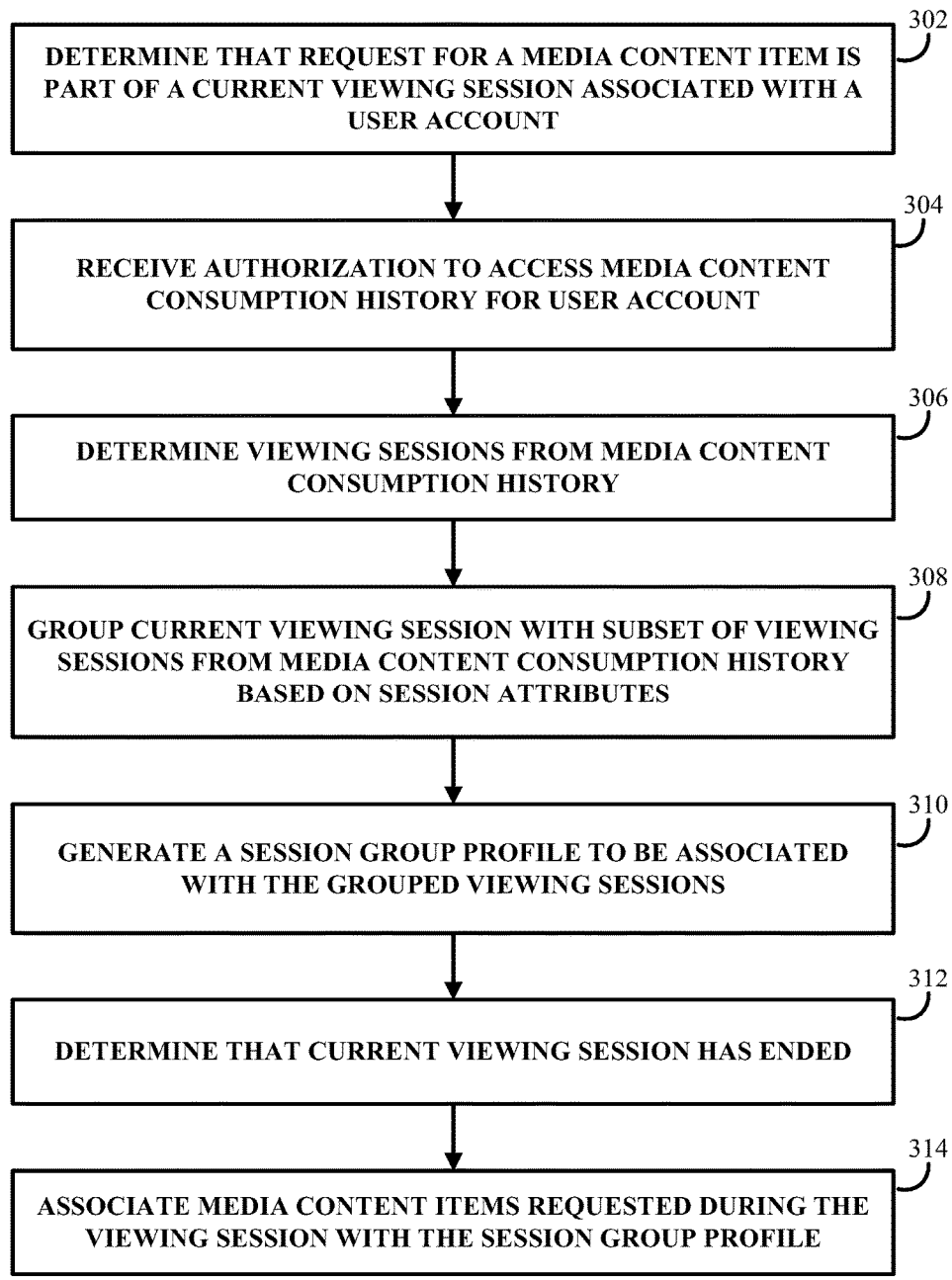
FIG. 3 shows an illustrative example of a process for matching a viewing session with one or more session group profiles in accordance with some embodiments of the disclosed subject matter.

FIG. 3 shows an example 300 of a process for associating a viewing session with a session group profile in accordance with some embodiments of the disclosed subject matter.

At 302, process 300 can determine that a request for a media content item is part of a viewing session that is associated with a user account.

In some embodiments, process 300 can determine that the request is part of a viewing session using any suitable technique or combination of techniques. For example, process 300 can use a technique as described above in connection with 108 of FIG. 1, a technique as described above in connection with FIG. 2, any other suitable technique, or any suitable combination thereof.

In some embodiments, process 300 can determine that the viewing session is associated with a user account using any suitable technique or combination of techniques. For example, process 300 can use a technique such as the one described above in connection with 104 of FIG. 1.

At 304, process 300 can receive an authorization to access a media content consumption history for the user account.

In some embodiments, process 300 can receive the authorization using any suitable technique or combination of techniques. For example, process 300 can cause a prompt to be presented to the user of the user device to provide the authorization upon log-in to the user account, upon creation of the user account, during playback of the requested media content item, and/or at any other suitable instance. As another example, upon loading a media playback application and/or web browser on a user device, the media playback application can prompt the user to provide such an authorization. This authorization can, for example, be repeated at each instance of authentication. In a more particular example, in response to downloading and/or installing the media playback application and/or web browser on the user device, the user can be prompted with a message that requests that the user provide such an authorization.

At 306, process 300 can determine one or more viewing sessions from the media content consumption history of the user account.

In some embodiments, process 300 can determine the viewing sessions from the media content consumption history using any suitable technique or combination of techniques and using any suitable information. For example, process 300 can use a technique and/or information as described above in connection with 108 of FIG. 1, a technique and/or information as described above in connection with FIG. 2, any other suitable technique and/or information, or any suitable combination thereof. As another example, process 300 can access and/or query a database of viewing sessions for viewing sessions associated with the user account (e.g., as described below in connection with FIG. 5). In a more particular example, process 300 can access a database that stores indications of viewing sessions, information associated with the media content items consumed during each viewing session (e.g., metadata, number of media content items, type of media content items, etc.), information associated with the media playback device used to present the media content items in the viewing session (e.g., device identification, device configuration, etc.), etc.

It should be noted that, prior to recording and/or accessing information related to a user's playback of and/or request for media content items (e.g., in a database of viewing sessions), or any other information relating to the user, process 100 can provide the user with an opportunity to provide affirmative consent or authorization to record any of the information described herein (e.g., as described below in connection with 304 of FIG. 3). For example, upon loading a media playback application on a user device, the media playback application can prompt the user to provide authorization for recording information associated with a user's playback of and/or request for media content items. In a more particular example, in response to downloading the media playback application and/or loading the media playback application on the user device, the user can be prompted with a message that requests that the user provide consent prior to recording any information. Additionally or alternatively, in response to installing the media playback application, the user can be prompted with a permission message that requests that the user provide consent prior to recording any information.

At 308, process 300 can group the current viewing session with a subset of one or more viewing sessions from the media content consumption history.

In some embodiments, process 300 can group the viewing sessions based on any suitable information. For example, the viewing sessions can be grouped based on session attribute information (e.g., as described above in connection with 106). As a more particular example, viewing sessions can be grouped based on session attribute information indicating that the viewing sessions have the same or similar device configuration, the same or similar application context, and/or are the same or similar with respect to any other suitable session attribute information. As another more particular example, viewing sessions can be grouped based on metadata associated with each of the media content items in the viewing sessions (e.g., metadata indicating that the media content items belong to a similar genre, have similar subject matter, and/or are similar with respect to any other suitable metadata information).

In some embodiments, process 300 can group the viewing sessions based on any suitable criteria related to the session attribute information, which is sometimes referred to herein as "session attribute criteria." For example, the session attribute criteria can include criteria directing viewing sessions that are associated with a particular application area to be grouped together (e.g., viewing sessions associated with a children's content application area). As another example, the session attribute criteria can include criteria directing viewing sessions that are associated with the same user device to be grouped together. As yet another example, the session attribute criteria can include criteria directing viewing sessions associated with the same or similar device configurations to be grouped together. In some embodiments, viewing sessions can be grouped based on two or more criteria being met (e.g., based on viewing sessions associated with the same user device and same application area).

In some embodiments, process 300 can group the viewing sessions based on media content items associated with session group profiles for other user accounts. For example, process 300 can determine whether the media content items contained in each viewing session determined from the media content consumption history are relatively frequently associated with the same session group profile when requested in connection with other user accounts. In such an example, in response to determining that a portion of the media content items contained in two or more of the viewing sessions are relatively frequently associated with the same session group profile (when the portion of media content items were requested in connection with one user account), process 300 can determine that the two or more viewing sessions should be grouped together.

At 310, process 300 can generate a session group profile to be associated with the grouped viewing sessions.

In some embodiments, process 300 can generate the session group profile using any suitable technique or combination of techniques and based on any suitable information. For example, process 300 can compare the session attribute information for each viewing session in the grouped viewing sessions to determine which session attributes are similar and/or the same between each viewing session. Process 300 can then generate the session group profile based on the similar and/or same attributes. As a more particular example, in a situation where all of the viewing sessions in the grouped viewing sessions are associated with a shared screen device configuration, process 300 can generate a session group profile that is associated with a shared screen device configuration. As another more particular example, in a situation where all of the viewing sessions include media content items associated with a particular topic (e.g., based on metadata associated with the media content items), process 300 can generate a session group profile that is associated with that particular topic. As yet another more particular example, in a situation where all of the viewing sessions in the grouped viewing sessions are associated with a particular application area (e.g., a children's application area), process 300 can generate a session group profile that is associated with that particular application area.

In some embodiments, process 300 can generate a session group profile that includes any suitable information (e.g., information as described above in connection with 110 of FIG. 1). For example, process 300 can generate a session group profile that includes any suitable session attribute information (e.g., as described above in connection with 106). As another example, process 300 can generate a session group profile that includes any suitable session attribute criteria (e.g., as described above in connection with 308). In such an example, process 300 can configure the session group profile such that future viewing sessions matching some or all of the session attribute criteria will subsequently be associated with the session group profile.

At 312, process 300 can determine that the current viewing session has ended.

In some embodiments, process 300 can determine that the current viewing session has ended using any suitable technique or combination of techniques and using any suitable information. For example, process 300 can determine that the current viewing session has ended using a technique as described above in connection with FIG. 2.

At 314, process 300 can associate the media content items requested during the viewing session with the generated session group profile.

In some embodiments, process 300 can associate the media content items with the generated session group profile using any suitable technique or combination of techniques. For example, process 300 can generate a unique identifier associated with the generated session group profile, and store the unique identifier in the media content consumption history in connection with the media content items. As another example, process 300 can store unique identifiers associated with each of the media content items in the generated session group profile. As another example, process 300 can store metadata associated with each of the media content items in the session group profile.

Figure 4:
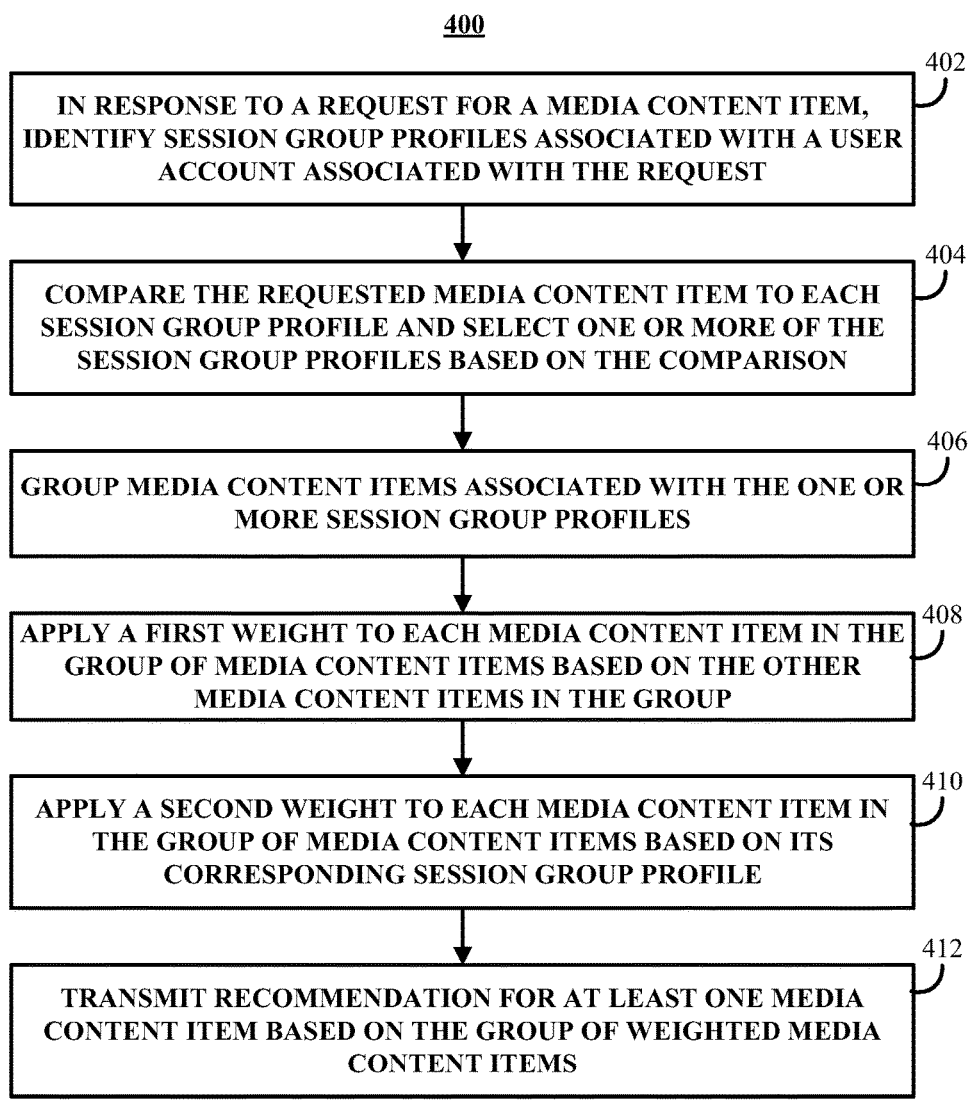
FIG. 4 shows an illustrative example of a process for recommending media content based on a session group profile that are generated based on attribute grouped viewing sessions in accordance with some embodiments of the disclosed subject matter.

FIG. 4 shows an example 400 of a process for recommending media content based on a session group profile that are generated based on attribute grouped viewing sessions in accordance with some embodiments of the disclosed subject matter.

At 402, in response to a request for a media content item, process 400 can identify session group profiles associated with a user account that is associated with the request.

In some embodiments, process 400 can identify session group profiles using any suitable technique or combination of techniques. For example, process 400 can query a database of session group profiles (e.g., as described below in connection with FIG. 5), query a media content consumption history database that includes session group profiles, query a media content consumption history database to determine session group profiles, receive information identifying session group profiles (e.g., unique identifiers corresponding to session group profiles) in connection with the request for the media content item, any other suitable technique, or any combination of techniques.

At 404, process 400 can compare the requested media content item to each session group profile and select one or more of the session group profiles to associate with the requested media content item based on the comparison.

In some embodiments, process 400 can compare the session group profiles to the media content item using any suitable technique or combination of techniques. For example, process 400 can perform the comparison using a technique as described below in connection with 110 of FIG. 1. As another example, process 400 can, for each of the identified session group profiles, determine session group profiles that are associated with other user accounts that are similar (e.g., based on having similar videos, having similar session attribute information, and/or having any other suitable similarity) and determine whether the requested media content item is included in the similar session group profiles (e.g., the requested media content item was also requested in connection with the similar session group profiles). In such an example, process 400 can associate the requested media content item with a particular session group profile in response to determining that the media content item is relatively frequently included in similar session group profiles.

In some embodiments, process 400 can determine that the media content item is relatively frequently included in similar session group profiles based on any suitable criteria. For example, process 400 can determine the relative frequency based on whether the media content item is included in more than a threshold proportion of similar session group profiles, included in more than a threshold number of similar session group profiles, included in more similar session group profiles than the other session group profiles associated with the user account, or any other suitable criteria for relative frequency.

In some embodiments, process 400 can perform the comparison based a similarity between session attribute information associated with the session group profiles and session attribute information associated with the media content item (e.g., as described above in connection with 110 of FIG. 1). For example, process 400 can compare the number of session attributes that each session group profile has in common with the request for the media content item.

In some embodiments, process 400 can calculate a score for each session group profile based on the comparison. For example, in a situation where process 400 performs the comparison based on session group profiles as described above, process 400 can calculate a score that corresponds to a likelihood that similar session group profiles include the requested media content item (e.g., a normalized likelihood score or normalized probability from 0 to 1). This normalized probability score can, for example, indicate how closely the requested media content item or current viewing session matches each session group profile. As another example, in a situation where process 400 performs the comparison based on session attribute information, process 400 can determine a similarity score that corresponds to the number and/or proportion of session attributes that each session group profile has in common with the request for the media content item.

In some embodiments, additionally or alternatively to associating the media content item with the one or more session group profiles, process 400 can associate the media content item with a viewing session (e.g., as described below in connection with 108 of FIG. 1, 214 of FIG. 2, 216 of FIG. 2, and/or 302 of FIG. 3) and associate the viewing session with the one or more session group profiles. In some such embodiments, process 400 can use the above-described techniques to compare each requested media content item in the viewing session to each identified session group profile and associate the viewing session with one or more session group profiles based on each comparison.

At 406, process 400 can group the media content items that are included in each of the one or more session group profiles that were associated with the requested media content item at 404. For example, the media content items associated with one or more selected session group profiles, which were selected based on a normalized probability score, based on a similarity score, etc., can be combined to generate a group of media content items.

In some embodiments, process 400 can group together all of the media content items that are included in the one or more session group profiles. For example, process 400 can identify each media content item that has been requested and/or presented in connection with each session group profile and combine the identified media content items into an aggregated group of media content items.

In some embodiments, process 400 can select a portion of the media content items that are included in the one or more session group profiles. For example, process 400 can select media content items that are relatively more representative of their corresponding session group profiles. As a more particular example, process 400 can compare each media content item to the other media content items associated with its corresponding session group profile (e.g., as described below in connection with 408) to determine which media content items are relatively more representative of the session group profile.

At 408, process 400 can apply a first weight to each media content item in the group of media content items based on other media content items in the group.

In some embodiments, the first weight can correspond to a likelihood that the media content item was requested in similar viewing sessions and/or session group profiles. For example, process 400 can identify viewing sessions and/or session group profiles associated with other user accounts that include some or all of the other media content items in the group (and/or the other media content items in the corresponding session group profile), and count the identified viewing sessions and/or session group profiles that include a request for the media content item. Process 400 can then determine the likelihood (e.g., a normalized probability) based on the count. As a more particular example, in a situation where a session group profile includes media content items A, B, C, and D, process 400 can determine the first weight for media content item A by identifying session group profiles that include requests for media content items B, C, and D, and count the identified viewing sessions that also include media content item A.

At 410, process 400 can apply a second weight to each media content item in the group of media content items based on its corresponding session group profile.

In some embodiments, process 400 can determine the second weight based on the comparison of the requested media content item and/or current viewing session with each session group profile identified at 404. For example, in a situation where process 400 determined a score for each session group profile at 404, the second weight can be based on, or correspond to, the determined score. As another example, process 400 can determine a score as described above in connection with 404 for each of the selected session group profiles. As yet another example, process 400 can determine the second weight based on a determined likelihood that the requested media content item and/or requested media content items included in the current viewing session would be included in similar viewing sessions and/or session group profiles, as described above in connection with 404.

It should be noted that any suitable weight can be applied to the media content item in the aggregated group of media content items. For example, each of the media content items can be weighted based on popularity (e.g., number of views, number of likes, etc.), popularity within a given time period (e.g., number of views within twelve hours), recency, relevancy to the media content item being currently presented, etc.

At 412, process 400 can transmit a recommendation for at least one media content item based on the group of weighted media content items.

In some embodiments, process 400 can determine recommended media content items using any suitable technique or combination of techniques. For example, process 400 can use a technique as described above in connection with 112 of FIG. 1. As another example, process 400 can determine recommended media content items by identifying similar session group profiles based on the weighted media content items and recommending popular media content items that are associated with the similar session group profiles.

In some embodiments, process 400 can recommend popular media content items using any suitable popularity information. For example, process 400 can select popular media content items based on which of the media content items have received the most requests and/or views, which of the media content items are trending (e.g., receiving the most recent views and/or receiving increasing numbers of views), which of the media content items are associated with more of the similar session group profiles, which of the media content items have been requested and/or viewed by other user accounts that are connected with the user account associated with the request at 402 (e.g., the user accounts are friends, contacts, followers, belong to the same group, and/or have any other suitable connection), any other suitable popularity information, or any suitable combination thereof.

In some embodiments, additionally or alternatively to using popularity information, process 400 can determine the recommendation based on other information associated with the user account (e.g., user settings, user content preferences, recent search queries, and/or any other suitable information).

It should be noted that, in some embodiments, process 400 can identify similar session group profiles based on an unweighted group of media content items (e.g., by refraining from applying the first and/or second weights at 408 and 410).

Figure 5:
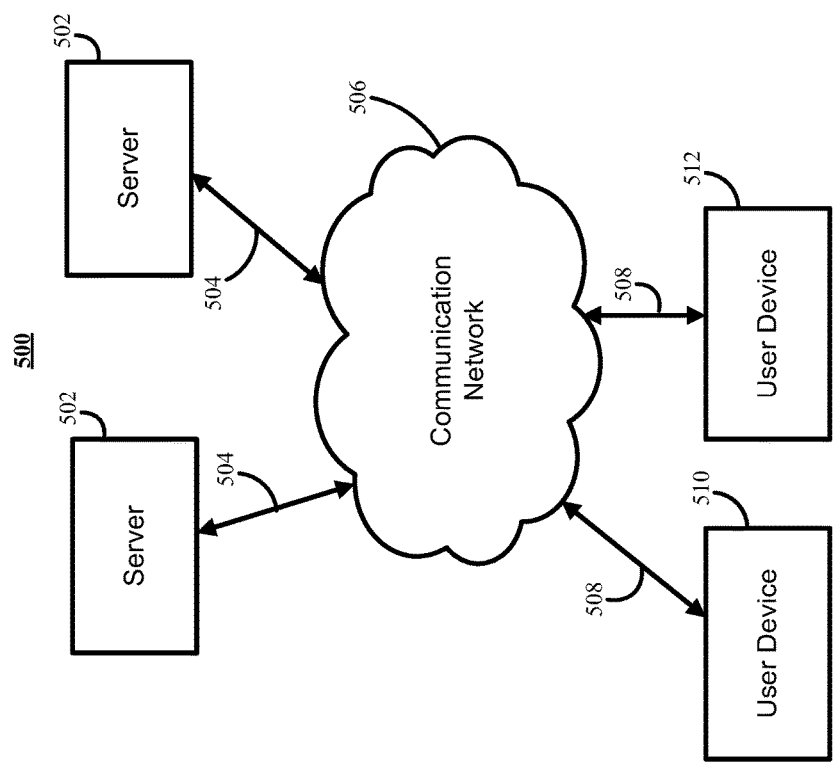
FIG. 5 shows an illustrative example of hardware that can be used in accordance with some embodiments of the disclosed subject matter for recommending media content based on attribute grouped viewing sessions.

FIG. 5 shows an example 500 of hardware that can be used in accordance with some embodiments of the disclosed subject matter for recommending media content based on viewing sessions. As illustrated, hardware 500 can include one or more servers 502 connected to a communication network 506 via one or more communication links 504, and/or one or more user devices, such as user devices 510 and 512, connected to communication network 506 via one or more communication links 508.

In some embodiments, server 502 can be any suitable server for storing media content items, delivering the media content items to user devices 510, and/or 512, receiving requests for media content items from user devices 510 and/or 512, storing information related to media content consumption history, viewing sessions, session attributes, and/or session group profiles, and/or transmitting recommended media content items to user devices 510, and/or 512. For example, server 502 can be a server that streams media content items to user devices 510 and/or 512 via communication network 506. Media content items provided by server 502 can be any suitable media content, such as video content, audio content, image content, text content, and/or any other suitable type of media content. As a more particular example, media content items can include user-generated content, music videos, television programs, movies, cartoons, sound effects, streaming live content (e.g., a streaming radio show, a live concert, and/or any other suitable type of streaming live content), and/or any other suitable type of media content. Media content items can be created by any suitable entity and/or uploaded to server 502 by any suitable entity. As another example, server 502 can be a server that hosts one or more databases (e.g., databases for log-in information, media content consumption history, viewing session information, session attribute information, and/or session group profile information).

Communication network 506 can be any suitable combination of one or more wired and/or wireless networks in some embodiments. For example, communication network 506 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 510, and/or 512 can be connected by one or more communications links 508 to communication network 506 which can be linked via one or more communications links 504 to one or more servers 502. One or more servers 502 can be linked via one or more communication links 504. Communications links 504, and/or 508 can be any communications links suitable for communicating data among user devices 510 and 512, and servers 502, such as network links, dial-up links, wireless links, hard-wired links, any other suitable communications links, or any suitable combination of such links.

User devices 510, and/or 512 can include any one or more user devices suitable for requesting media content items, searching for media content items, presenting media content items, presenting advertisements, receiving input for presenting media content and/or any other suitable functions. For example, in some embodiments, user devices 510, and/or 512 can be implemented as a mobile device, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 510, and/or 512 can be implemented as a non-mobile device such as a desktop computer, a set-top box, a television, a streaming media player, a game console, and/or any other suitable non-mobile device. In some embodiments, user devices 510 and/or 512 can be linked via communications links 508 with communication network 506 such that the user devices can share screen information (e.g., in a shared screen device configuration), share audio information (e.g., in an audio system configuration), share any other suitable information, and/or implement any other suitable device configuration.

Although the one or more servers 502 are illustrated as separate devices, the functions performed by server 502 can be performed using any suitable number of devices in some embodiments. For example, in some embodiments, the functions performed by server 502 can be performed on a single server. As another example, in some embodiments, multiple devices can be used to implement the functions performed by server 502.

Although two user devices 510 and 512 are shown in FIG. 5 to avoid over-complicating the figure, any suitable number of user devices, and/or any suitable types of user devices, can be used in some embodiments.

Figure 6:
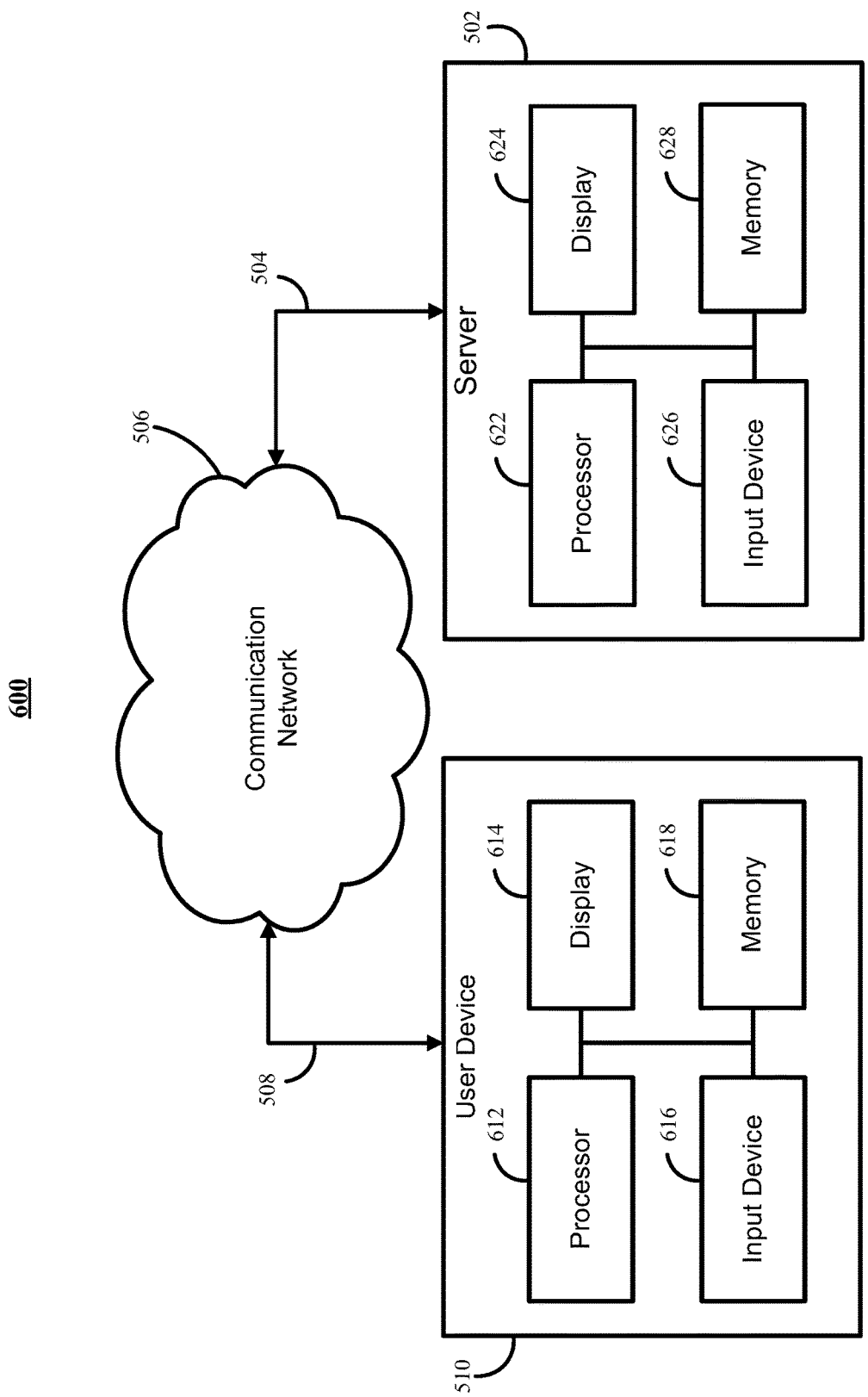
FIG. 6 shows an illustrative example of hardware that can be used in a server and/or a user device of FIG. 5 in accordance with some embodiments of the disclosed subject matter.

Server 502 and user devices 510, and/or 512 can be implemented using any suitable hardware in some embodiments. For example, in some embodiments, devices 502, 510, and/or 512 can be implemented using any suitable general purpose computer or special purpose computer. As another example, a mobile phone may be implemented as a special purpose computer. Any such general purpose computer or special purpose computer can include any suitable hardware. For example, turning to FIG. 6, user device 510 can include a hardware processor 612, a memory and/or storage 618, an input device 616, and a display 614.

Hardware processor 612 can execute the mechanisms described herein for initiating requests for content, transmitting session attribute information and/or session group profile information, and/or to perform any other suitable functions in accordance with the mechanisms described herein for recommending media content based on viewing sessions (e.g., as described above in connection with FIG. 1, FIG. 2, FIG. 3, and/or FIG. 4). In some embodiments, hardware processor 612 can send and receive data through communications link 508 or any other communication links using, for example, a transmitter, a receiver, a transmitter/receiver, a transceiver, or any other suitable communication device. In some embodiments, memory and/or storage 618 can include a storage device for storing data received through communications link 508 or through other links. The storage device can further include a program for controlling hardware processor 612. In some embodiments, memory and/or storage 618 can include information stored as a result of user activity (e.g., requests for media content items, playback of media content items, etc.). Display 614 can include a touchscreen, a flat panel display, a cathode ray tube display, a projector, a speaker or speakers, and/or any other suitable display and/or presentation devices. Input device 616 can be a computer keyboard, a computer mouse, a touchpad, a voice recognition circuit, a touchscreen, and/or any other suitable input device. In some embodiments, user device 512 can be implemented using any of the above-described hardware for user device 510.

Server 502 can include a hardware processor 622, a display 624, an input device 626, and a memory and/or storage 628, which can be interconnected. In some embodiments, memory and/or storage 628 can include a storage device for storing data received through communications link 504 or through other links. The storage device can further include a server program for controlling hardware processor 622. In some embodiments, memory and/or storage 628 can include information stored as a result of user activity (e.g., information related to media content consumption history, viewing sessions, session attributes, and/or session group profiles, etc.), and hardware processor 622 can receive requests for such information. In some embodiments, the server program can cause hardware processor 622 to, for example, execute at least a portion of process 100 described below in connection with FIG. 1, process 200 described below in connection with FIG. 2, process 300 described below in connection with FIG. 3, and/or process 400 described below in connection with FIG. 4.

Hardware processor 622 can use the server program to communicate with user devices 510, and/or 512 as well as provide access to and/or copies of the mechanisms described herein. It should also be noted that data received through communications links 504 and/or 508 or any other communications links can be received from any suitable source. In some embodiments, hardware processor 622 can send and receive data through communications link 504 or any other communication links using, for example, a transmitter, a receiver, a transmitter/receiver, a transceiver, or any other suitable communication device. In some embodiments, hardware processor 622 can receive commands and/or values transmitted by one or more user devices 510 and/or 512, such as a user that makes changes to adjust settings associated with the mechanisms described herein for recommending media content based on viewing sessions. Display 624 can include a touchscreen, a flat panel display, a cathode ray tube display, a projector, a speaker or speakers, and/or any other suitable display and/or presentation devices. Input device 626 can be a computer keyboard, a computer mouse, a touchpad, a voice recognition circuit, a touchscreen, and/or any other suitable input device.

Any other suitable components can be included in hardware 600 in accordance with some embodiments.

In some embodiments, at least some of the above described blocks of the processes of FIG. 1, FIG. 2, FIG. 3, and/or FIG. 4 can be executed or performed in any order or sequence not limited to the order and sequence shown in and described in connection with the figures. Also, some of the above blocks of FIG. 1, FIG. 2, FIG. 3, and/or FIG. 4 can be executed or performed substantially simultaneously where appropriate or in parallel to reduce latency and processing times. Additionally or alternatively, in some embodiments, some of the above described blocks of the processes of FIG. 1, FIG. 2, FIG. 3, and/or FIG. 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (e.g., hard disks, floppy disks, and/or any other suitable magnetic media), optical media (e.g., compact discs, digital video discs, Blu-ray discs, and/or any other suitable optical media), semiconductor media (e.g., flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for recommending media content based on attribute grouped viewing sessions are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A computer-implemented method for recommending media content, the method comprising:
    receiving, using a hardware processor, an authorization to access a media content consumption history associated with an authenticated user account;
    determining that the media content consumption history associated with the authenticated user account includes a plurality of viewing sessions that each include media content items that have been consumed during that viewing session, wherein each of the plurality of viewing sessions is associated with a plurality of session attributes;
    determining whether the plurality of session attributes associated with each of the plurality of viewing sessions meets session attribute criteria, wherein the session attribute criteria includes information related to an application executing on a user device associated with the authenticated user account, and wherein the application was used to view media content during at least one of the plurality of viewing sessions;
    generating a plurality of session group profiles by grouping a subset of viewing sessions from the plurality of viewing sessions based on the plurality of session attributes meeting the session attribute criteria;
    determining that a user device using the authenticated user account is consuming a media content item in a current viewing session;
    determining whether the user device is likely to view additional media content items associated with at least one of the plurality of session group profiles by comparing session attributes of the current viewing session with each of the plurality of session group profiles;
    in response to determining that the current viewing session matches a session group profile from the plurality of session group profiles based on the comparison, combining the media content items associated with the session group profile with the media content item in the current viewing session; and
    causing a recommended media content item to be presented on the user device for the user of the authenticated user account, wherein the recommended media content item is selected from the combined media content items.

2. The method of claim 1, wherein determining whether the plurality of session attributes associated with the plurality of viewing sessions meets session attribute criteria further comprises determining whether the plurality of session attributes associated with each of the plurality of viewing sessions indicates that an application context is included in one of a subset of a plurality of application contexts, and wherein the application context includes the information related to the application executing on the user device.

3. The method of claim 1, wherein the session attribute criteria includes an indication that a viewing session was a shared screen session using a media playback device.

4. The method of claim 1, wherein the session attribute criteria includes device configuration information associated with a device that presented the media content items in one of the plurality of viewing sessions.

5. The method of claim 1, wherein the current viewing session includes media content items that have been presented and related media content items that relate to at least one of the media content items.

6. The method of claim 1, wherein the recommended media content item presented on the user device is selected from the combined media content items and media content items associated with similar session group profiles associated with user accounts other than the authenticated user account.

7. The method of claim 1, further comprising applying a representative weight to each media content item associated with one of the plurality of viewing sessions, wherein the representative weight is determined based on a normalized probability that each media content item will be watched by users who have also seen the remaining media content items in that viewing session.

8. The method of claim 1, further comprising applying a matching weight to each of the plurality of viewing sessions, wherein the matching weight is determined based on a similarity score between the current viewing session and one of the plurality of viewing sessions.

9. A system for recommending media content, the system comprising:
    a hardware processor that is configured to:
        receive an authorization to access a media content consumption history associated with an authenticated user account, wherein the media content consumption history includes a plurality of viewing sessions that each include media content items that have been consumed during that viewing session and wherein each of the plurality of viewing sessions is associated with session attribute information,
        determine that the media content consumption history associated with the authenticated user account includes a plurality of viewing sessions that each include media content items that have been consumed during that viewing session, wherein each of the plurality of viewing sessions is associated with a plurality of session attributes;
        determine whether the plurality of session attributes associated with each of the plurality of viewing sessions meets session attribute criteria, wherein the session attribute criteria includes information related to an application executing on a user device associated with the authenticated user account, and wherein the application was used to view media content during at least one of the plurality of viewing sessions;
        generate a plurality of session group profiles by grouping a subset of viewing sessions from the plurality of viewing sessions based on the plurality of session attributes meeting the session attribute criteria;
        determine that a user device using the authenticated user account is consuming a media content item in a current viewing session;
        determine whether the user device is likely to view additional media content items associated with at least one of the plurality of session group profiles by comparing session attributes of the current viewing session with each of the plurality of session group profiles;

in response to determining that the current viewing session matches a session group profile from the plurality of session group profiles based on the comparison, combine the media content items associated with the session group profile with the media content item in the current viewing session; and cause a recommended media content item to be presented on the user device for the user of the authenticated user account, wherein the recommended media content item is selected from the combined media content items.

10. The system of claim 9, wherein determining whether the plurality of session attributes associated with the plurality of viewing sessions meets session attribute criteria further comprises determining whether the plurality of session attributes associated with each of the plurality of viewing sessions indicates that an application context is included in one of a subset of a plurality of application contexts, and wherein the application context includes the information related to the application executing on the user device.

11. The system of claim 9, wherein the session attribute criteria includes an indication that a viewing session was a shared screen session using a media playback device.

12. The system of claim 9, wherein the session attribute criteria includes device configuration information associated with a device that presented the media content items in one of the plurality of viewing sessions.

13. The system of claim 9, wherein the current viewing session includes media content items that have been presented and related media content items that relate to at least one of the media content items.

14. The system of claim 9, wherein the recommended media content item presented on the user device is selected from the combined media content items and media content items associated with similar session group profiles associated with user accounts other than the authenticated user account.

15. The system of claim 9, wherein the hardware processor is further configured to apply a representative weight to each media content item associated with one of the plurality of viewing sessions, wherein the representative weight is determined based on a normalized probability that each media content item will be watched by users who have also seen the remaining media content items in that viewing session.

16. The system of claim 9, wherein the hardware processor is further configured to apply a matching weight to each of the plurality of viewing sessions, wherein the matching weight is determined based on a similarity score between the current viewing session and one of the plurality of viewing sessions.

17. A non-transitory computer-readable medium containing computer executable instructions that, when executed by a processor, cause the processor to perform a method for recommending media content, the method comprising:

receiving, using a hardware processor, an authorization to access a media content consumption history associated with an authenticated user account, wherein the media content consumption history includes a plurality of viewing sessions that each include media content items that have been consumed during that viewing session and wherein each of the plurality of viewing sessions is associated with session attribute information;

determining that the media content consumption history associated with the authenticated user account includes a plurality of viewing sessions that each include media content items that have been consumed during that viewing session, wherein each of the plurality of viewing sessions is associated with a plurality of session attributes;

determining whether the plurality of session attributes associated with each of the plurality of viewing sessions meets session attribute criteria, wherein the session attribute criteria includes information related to an application executing on a user device associated with the authenticated user account, and wherein the application was used to view media content during at least one of the plurality of viewing sessions;

generating a plurality of session group profiles by grouping a subset of viewing sessions from the plurality of viewing sessions based on the plurality of session attributes meeting the session attribute criteria;

determining that a user device using the authenticated user account is consuming a media content item in a current viewing session;

determining whether the user device is likely to view additional media content items associated with at least one of the plurality of session group profiles by comparing session attributes of the current viewing session with each of the plurality of session group profiles;

in response to determining that the current viewing session matches a session group profile from the plurality of session group profiles based on the comparison, combining the media content items associated with the session group profile with the media content item in the current viewing session; and causing a recommended media content item to be presented on the user device for the user of the authenticated user account, wherein the recommended media content item is selected from the combined media content items.

* * * * *